United States Patent [19]

Gruwez

[11] Patent Number: 5,307,844
[45] Date of Patent: May 3, 1994

[54] WEAVING MACHINE HAVING SEPARABLE PARTS WITH CONSTRAINED GUIDANCE UPON ASSEMBLY AND RE-ASSEMBLY

[75] Inventor: Marc Gruwez, Zwalm, Belgium

[73] Assignee: Picanol N.V., Belgium

[21] Appl. No.: 21,595

[22] Filed: Feb. 24, 1993

[30] Foreign Application Priority Data

Feb. 27, 1992 [BE] Belgium .............................. 09200197

[51] Int. Cl.5 ............................................. D03D 49/02
[52] U.S. Cl. .................................. 139/1 R; 242/58.6; 28/208; 403/13; 29/464
[58] Field of Search .............. 242/56 R, 58.6; 28/208, 28/201; 139/1 R; 29/525.1, 464, 466; 403/13, 14

[56] References Cited

U.S. PATENT DOCUMENTS

| | | | |
|---|---|---|---|
| 3,675,686 | 7/1972 | Steiner et al. | 28/208 |
| 4,910,837 | 3/1990 | Fujimoto et al. | 139/1 R X |
| 4,934,413 | 6/1990 | Yao | 139/1 R |
| 5,224,518 | 7/1993 | Lefever et al. | 139/1 R |

FOREIGN PATENT DOCUMENTS

| | | |
|---|---|---|
| 3615942 | 11/1987 | Fed. Rep. of Germany . |
| 62-133150 | 6/1987 | Japan . |
| 3-206154 | 9/1991 | Japan . |
| 668608 | 1/1989 | Switzerland . |
| 2139253 | 11/1984 | United Kingdom ............... 139/1 R |

Primary Examiner—Andrew M. Falik
Attorney, Agent, or Firm—Bacon & Thomas

[57] ABSTRACT

A two-part weaving machine includes a stationary machine-frame part containing at least a takeup for winding woven material, and a removable machine-frame part containing at least the bearing for a warp beam. The two machine-frame parts include mutually engaging guides which define a path for constraining the relative motion of the two parts during initial removal of the removable part from the stationary part, and during final re-assembly of the removable part to the stationary part, thus permitting fitting of the two parts together in a compact arrangement without unintentional contact between the respective mechanisms carried by the two parts, and enabling the removal and final re-assembly to be carried out using simple vertical and horizontal movements of the conveyance device.

15 Claims, 2 Drawing Sheets

WEAVING MACHINE HAVING SEPARABLE PARTS WITH CONSTRAINED GUIDANCE UPON ASSEMBLY AND RE-ASSEMBLY

FIELD OF THE INVENTION

The invention concerns a weaving machine in which at least one stationary part of the machine frame contains means to wind up materials, and in which a second part of the machine frame, separable from the former part, and contains at least the bearing for a warp beam.

DESCRIPTION OF RELATED ART

In order to provide access to a weaving machine normally situated in a constrained space, it is known from Swiss patent 668 608 A5 either to move the weaving machine as a whole by a bridge crane to another less constrained work space, or to split the weaving machine into two parts and to move only one of them to the free work space. In the latter case of a two-part weaving machine, the stationary part includes a harness drive, a batten drive, a takeoff drive and a complete material wind-up system. The removable part of the machine frame includes a warp beam with associated drive, a harness system, a batten and a takeoff system for the finished material. When the two parts are separated, the connections between the harness system, the batten and the takeoff system to the particular drives are severed and the connections thus must be re-established when the removable part is re-assembled to the stationary part.

SUMMARY OF THE INVENTION

The object of the invention is to improve the design of the above-cited separable or bifurcated weaving machine so as to simplify the labor attending the removal and return of the removable part, and in particular so that simple transport means may be used in such operations.

This problem is solved in that the two separable parts of the machine frame are fitted with mutually engaging guides which determine a specific path for the motion of the removable part relative to the stationary part of the machine frame during separation or re-assembly.

The invention entails constrained guidance during removal or re-assembly, and accordingly even comparatively complex relative motions can be reliably carried out without demanding transport means having complex controls. The guide means ensure that during removal or re-assembly, the components of the removable part do not unintentionally contact components of the stationary part, which might cause damage, while allowing the removable part and the components borne by it to extend, following re-assembly, fairly far into the stationary part in the direction of advance of the warps, i.e., the direction of material advance, resulting in compactness of the assembled weaving machine in that direction. In contrast to guided movement of the removable part, controlled movement by a lifting apparatus would require complex control means, considering that the warp beam alone already may weigh 15 kN.

BRIEF DESCRIPTION OF THE DRAWINGS

Further features and advantages of the invention are elucidated in the following description of the illustrative embodiment shown in the drawings.

DETAILED DESCRIPTION OF THE PREFERRED EMBODIMENT

Figure 1:
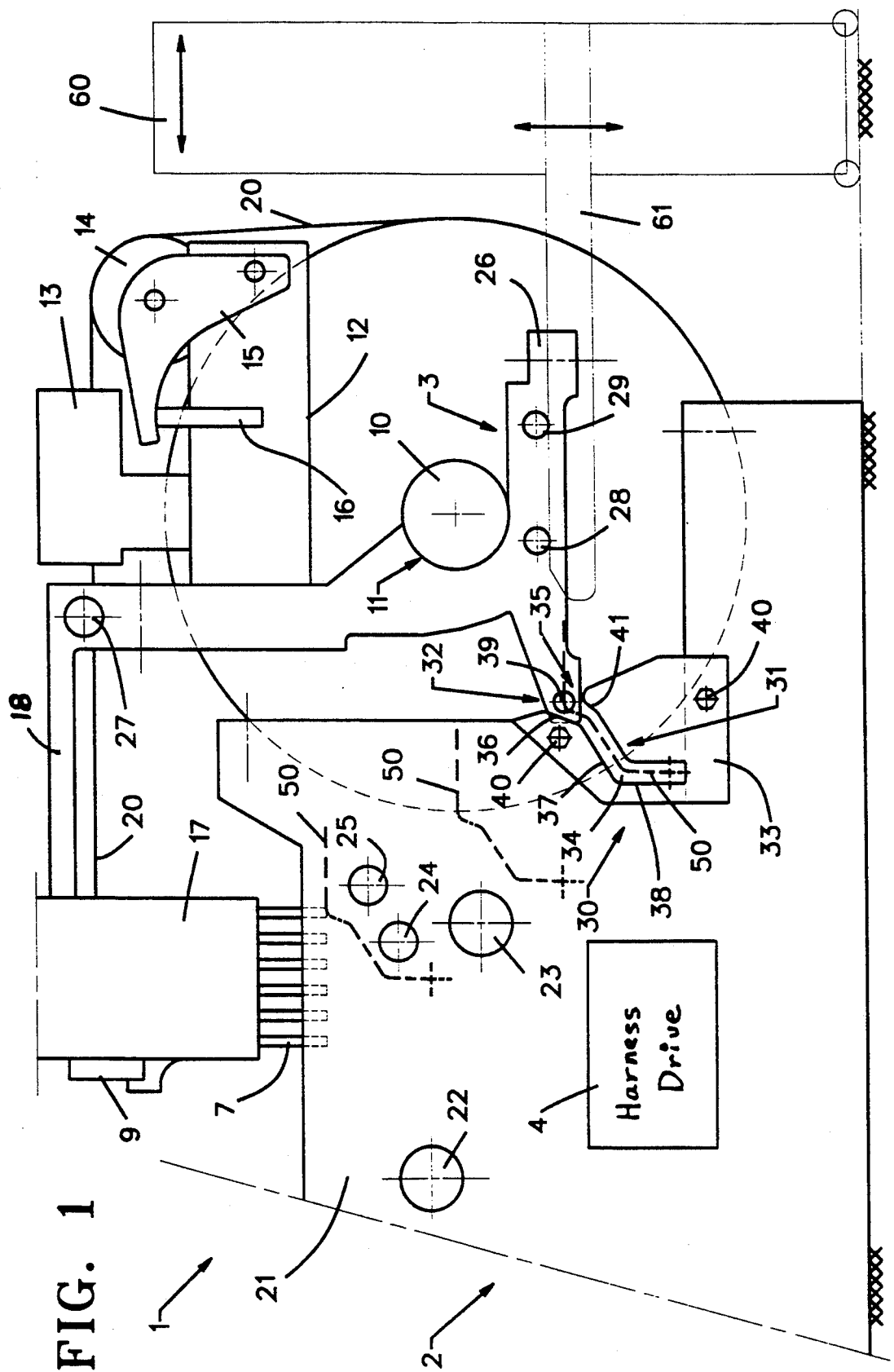
FIG. 1 is an elevation of a two-part weaving machine shown during removal or re-assembly of a removable machine part from or to a stationary part.

The illustrated weaving machine 1 includes a machine frame constituted by a stationary part 2 and a removable part 3. The partition joint of the two machine-frame parts 2 and 3 essentially runs transversely to the direction of advance of the material to be woven. Stationary part 2 of the machine frame contains a conventional batten drive (not shown), a conventional fabric wind-up system (not shown), a conventional warp-beam drive and a conventional harness drive 4 which is shown schematically. The harnesses 7 moving inside harness guides 17, and the warp beam 10 with a bearing 11, are mounted in the removable part 3 of the machine frame. The guide 17 for the harnesses 7 includes a holding means for a reed 9. Removable part 3 includes horizontal arm 18 extending in the direction of material advance above the warp-beam bearing 11 and supporting guide 17. A support 12 bearing a deflection roller 14 for guiding and tensioning warps 20 is mounted in a region of the removable part 3 which extends essentially vertically above the warp-beam bearing 11. The deflecting roller 14 rests in a rocker 15 pivotably supported by the support 12 and braced against a compression spring 16. Warp stop motions 13 are located between the deflection roller 14 and the guide 17. The warps 20 taken off the warp beam 10 move upward on the side of the guide which is away from the harnesses 7 and over the deflection roller 14, through the warp stop motions 13 toward the harnesses 17 and through the reed 9.

The stationary part 2 of the machine frame includes two lamellar side parts 21 connected to each other by several cross-braces 22, 23. Further components such as drive shafts 24, 25 or the like are also mounted between the side parts 21.

The removable part 3 also includes two side parts 26 which include the above-mentioned arms 18 and bearing 11 for the warp beam 10, and which are mounted a distance apart corresponding to that between the side parts 21 and receive between them the warp beam 10. The side parts 26 are fitted with bolts 28, 29 present at an essentially horizontal leg below the warp-beam bearing 11. Furthermore, the side parts 26 are connected together by a cross-brace 27 above the maximum diameter of the warp beam 10.

Figure 2:
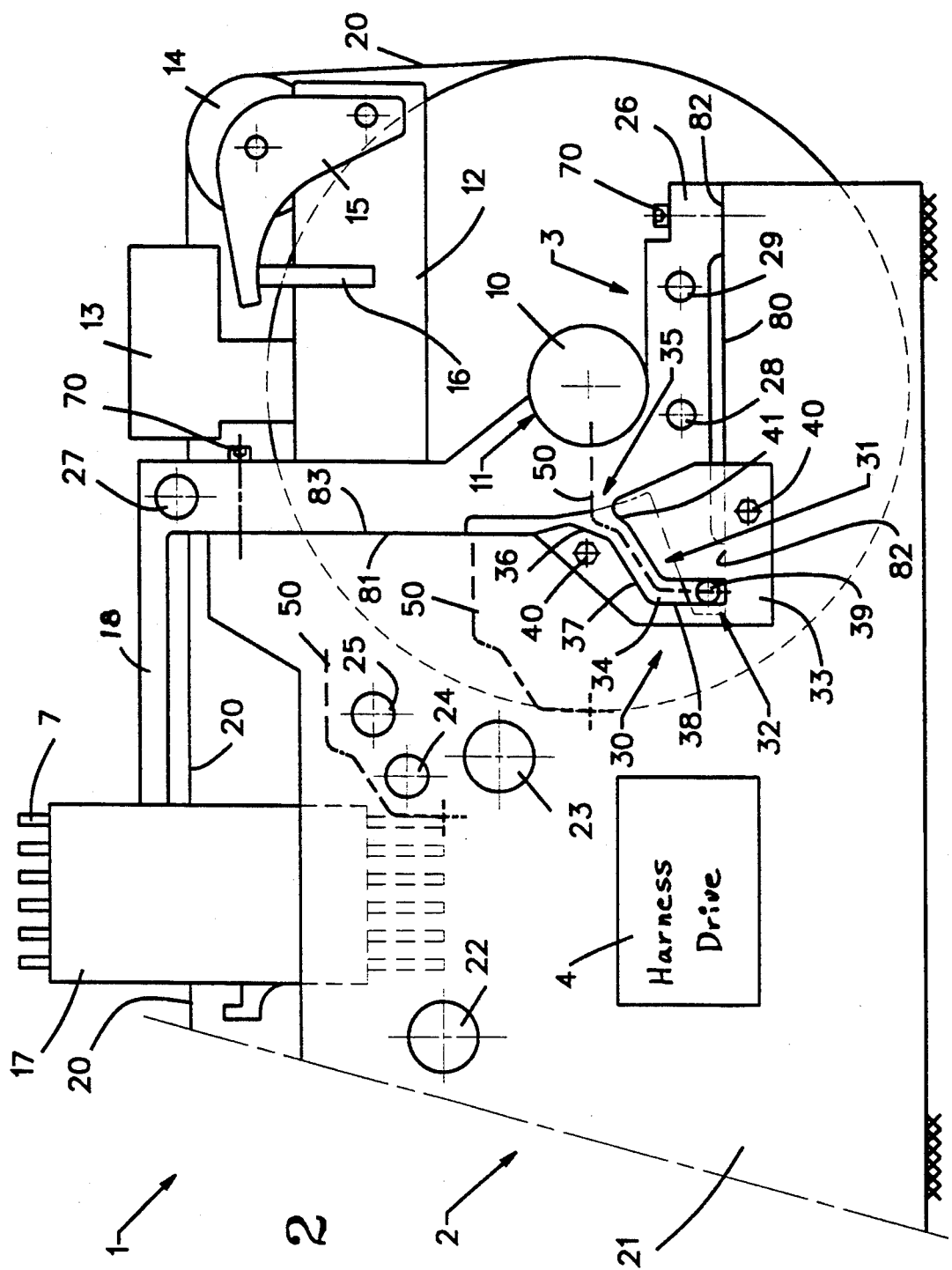
FIG. 2 shows the weaving machine of FIG. 1 when the two parts are assembled for operation.

Each of the side parts 21 of the stationary machine-frame part 2 comprises a horizontal guide and rest surface 80 and a vertical guide and rest surface 81 associated with corresponding guide surfaces 82, 83 of the side parts 26 of removable part 3. In the operational position (FIG. 2), the side parts 21 and 26 rest against each other by means of these guide and rest surfaces 81 through 83. In this position, the two machine-frame parts 2, 3 are connected together, illustratively by means of bolts 70 passing through the side parts 26 and threaded into the side parts 21. The horizontal guide and rest surface 82 of the side parts 26 is divided by a clearance into two foot-shaped segments arrayed horizontally at least approximately equidistantly from the axis of the warp-beam bearing 11, as a result of which the vertical load is supported evenly.

The two machine-frame parts 2, 3 comprise guides 30 which are path-constraining for the final motion of re-assembling or for the initial motion of removing the displaceable part 3, that is, they constrain the path for that portion of the motion where the harnesses 7 and the warp beam 10 extend into the stationary part 2. The guides 30 determine a guide path 50 along which the removable part 3 is constrained to move when the components it bears, that is the warp beam 10 and the harnesses 7, are being displaced in that zone where components of stationary part 2, such as the shafts 24, 25 or the cross-beams 22, 23, are located. This ensures that the components of the removable part 3 are kept clear of the components of the stationary part 2 during re-assembly or removal.

In the embodiment shown, the guides 30 include guide components 31 mounted to the side parts 21 of the machine-frame part 2, each of components 31 consisting of a plate 33 which includes an upwardly open slot 34. The plates 33 are affixed by screws 40 to the side parts 21. The slots 34 of the plates 33 each include an insertion segment 35 bounded by two converging lateral edges 36, 41. An oblique slot segment 37 adjoins this insertion segment 35 and merges into a vertical segment 38.

The slots 34 of the guide components 31 are associated with guide components 32 in the form of lateral pins 39 mounted at the front end of the side parts 26 and each guided with slight play in the slots 34.

The removal of the removable part 3 from the stationary part 2, and also the re-assembly of the removable part 3 to the stationary part 2, can be implemented using a simple conveyance 60 made up of a carriage for horizontal displacement and a hoisting system. The hoisting system may be, for example, in the form of a single fork-lift which includes two horizontally arrayed forks 61, by means of which a load can be raised and lowered. The forks 61 pick up the part 3 at the bolts 28, 29 as shown by FIG. 1. During re-assembly, the conveyance 60 moves horizontally toward the stationary part 2 until the pins 39 arrive at the edge 36 of the insertion segment 35. Thereupon the forks 61 are lowered, and consequently pins 39 enter the slot 34. Because the lower lateral edge 41 projects beyond the lateral edge 36 in the direction to the warp beam, the pins 39 enter the insertion segment 35 via a lowering motion, without need for a further horizontally controlled drive motion. Because of the constrained path determined by the guides, the machine-frame part 3 moves along the path 50 without any need to control this displacement. Once the brake is released, the conveyance 60 can follow this displacement. In a corresponding manner, the machine-frame part 3 can be removed from the stationary part 2. It suffices in this respect to merely raise the forks 61 acting on the journals 28, 29, the removable part 3 thereupon carrying out a horizontal displacement in addition to the lift produced by the forks 61.

Before removing the part 3, the reed 9 should be detached from the reed drive and inserted into the holding means of the harness guide 17. After the parts 2, 3 have been re-assembled, the reed 9 is removed from the holding means and reconnected to the reed drive mounted in the stationary machine-frame part 2.

Before the removable part 3 is removed from the stationary machine-part 2, the linkage between the harness drive 4 and the harnesses 7 must be disconnected, and subsequently re-established after the two parts 2,3 are re-assembled. Suitable connector elements for harness drive 4 and harnesses 7 are disclosed in the U.S. Pat. No. 3,888,284, although it will be appreciated that other such connectors may be substituted.

Furthermore, the warp-beam drive must be separated from the warp beam 10 before removing the removable part 3 from the stationary part 2. Upon re-assembly, that connection must be re-established. Illustratively, a drive system such as is disclosed in the European patent document 0 451 895 A1 is suitable for this purpose.

Having thus described in detail a preferred embodiment of the invention, it will be understood by those skilled in the art that the description is not to be taken as limiting. Instead, it is intended that the scope of the invention be defined solely by the appended claims.

I claim:

1. In a weaving machine, comprising a stationary first machine-frame part containing at least means for winding up a woven material and a second machine-frame part removable from the first part and containing at least means including a bearing for supporting a warp beam when the second machine-frame part is re-assembled to the first machine-frame part, the improvement wherein the stationary and removable machine-frame parts include mutually engaging guide means including a first guide element fixed to said first machine-frame part and a second guide element fixed to the second machine-frame part for constraining movement of the removable part to a predetermined path upon engagement between said guide elements during re-assembly with or removal from the stationary part.

2. A weaving machine as claimed in claim 1, further comprising a harness drive mounted in the stationary part.

3. A weaving machine as claimed in claim 1, further comprising a warp-beam drive mounted in the stationary part.

4. A weaving machine as claimed in claim 1, further comprising means for guiding and tensioning warps, said warp guiding and tensioning means being mounted in the removable part in a takeoff direction of the warps between the warp beam and a harness guide.

5. A weaving machine as claimed in claim 4, wherein the harness guide comprises a holding means for holding a reed.

6. A weaving machine as claimed in claim 4, further comprising a warp stop motion mounted on the removable part between the warp guiding and tensioning means and the harness guide.

7. A weaving machine as claimed in claim 1, wherein the mutually engaging guides include a pin mounted on one of the first and second machine-frame parts, and a guide slot in the other of the first and second machine-frame parts, said pin fitting within said guide slot.

8. A weaving machine as claimed in claim 7, wherein said pin is mounted on the removable part and the guide slot is defined by a guide plate mounted on the stationary part.

9. A weaving machine, comprising a stationary first machine-frame part containing at least means for winding up a woven material and as second machine-frame part removable from the first part and containing at least means including a bearing for supporting a warp beam when the second machine-frame part is re-assembled to the first machine-frame part, the improvement wherein the stationary and removable machine-frame parts include mutually engaging guide means including a first guide element fixed to said first machine-frame part and a second guide element fixed to the second machine-frame part for constraining movement of the removable part to a predetermined path upon engagement between said guide elements during re-assembly with or removal from the stationary part, and wherein the removable machine-frame part comprises arms extending away from the bearing of the warp beam, the arms supporting a harness guide.

10. A weaving machine as claimed in claim 9, further comprising a harness drive mounted in the stationary part.

11. A weaving machine, comprising a stationary first machine-frame part containing at least means for winding up a woven material and a second machine-frame part removable from the first part and containing at least means including a bearing for supporting a warp beam when the second machine-frame part is re-assembled to the first machine-frame part, the improvement wherein the stationary and removable machine-frame parts include mutually engaging guide means including a first guide element fixed to said first machine-frame part and a second guide element fixed to the second machine-frame part for constraining movement of the removable part to a predetermined path upon engagement between said guide elements during re-assembly with or removal from the stationary part, and wherein said path includes an oblique insertion slot which merges into an essentially vertical segment.

12. A weaving machine, comprising a stationary first machine-frame part containing at least means for winding up a woven material and a second machine-frame part removable from the first part and containing at least means including a bearing for supporting a warp beam when the second machine-frame part is re-assembled to the first machine-frame part, the improvement wherein the stationary and removable machine-frame parts include mutually engaging guide means including a first guide element fixed to said first machine-frame part and a second guide element fixed to the second machine-frame part for constraining movement of the removable part to a predetermined path upon engagement between said guide elements during re-assembly with or removal from the stationary part, and wherein the removable part comprises side parts connected to each other by at least one cross-brace, said side parts including means defining rest and guide surfaces which engage corresponding rest and guide surfaces of corresponding side parts of the stationary part.

13. A weaving machine, comprising a stationary first machine-frame part containing at least means for winding up a woven material and a second machine-frame part removable from the first part and containing at least means including a bearing for supporting a warp beam when the second machine-frame part is re-assembled to the first machine-frame part, the improvement wherein the stationary and removable machine-frame parts include mutually engaging guide means including a first guide element fixed to said first machine-frame part and a second guide element fixed to the second machine-frame part for constraining movement of the removable part to a predetermined path upon engagement between said guide elements during re-assembly with or removal from the stationary part, and wherein the removable part comprises side parts connected to each other by at least one cross-brace, said side parts including means defining rest and guide surfaces which engage corresponding rest and guide surfaces of corresponding side parts of the stationary part.

14. A weaving machine as claimed in claim 13, wherein the side parts of the removable part include means engageable with a conveyance means for enabling the conveyance to carry the removable part during removal from and re-assembly with the stationary part.

15. A weaving machine as claimed in claim 14, wherein said means engageable with a conveyance are bolts extending laterally from said side plates.

* * * * *